Dec. 10, 1935.  T. H. MANSFIELD  2,023,765
VALVE
Filed Dec. 5, 1934
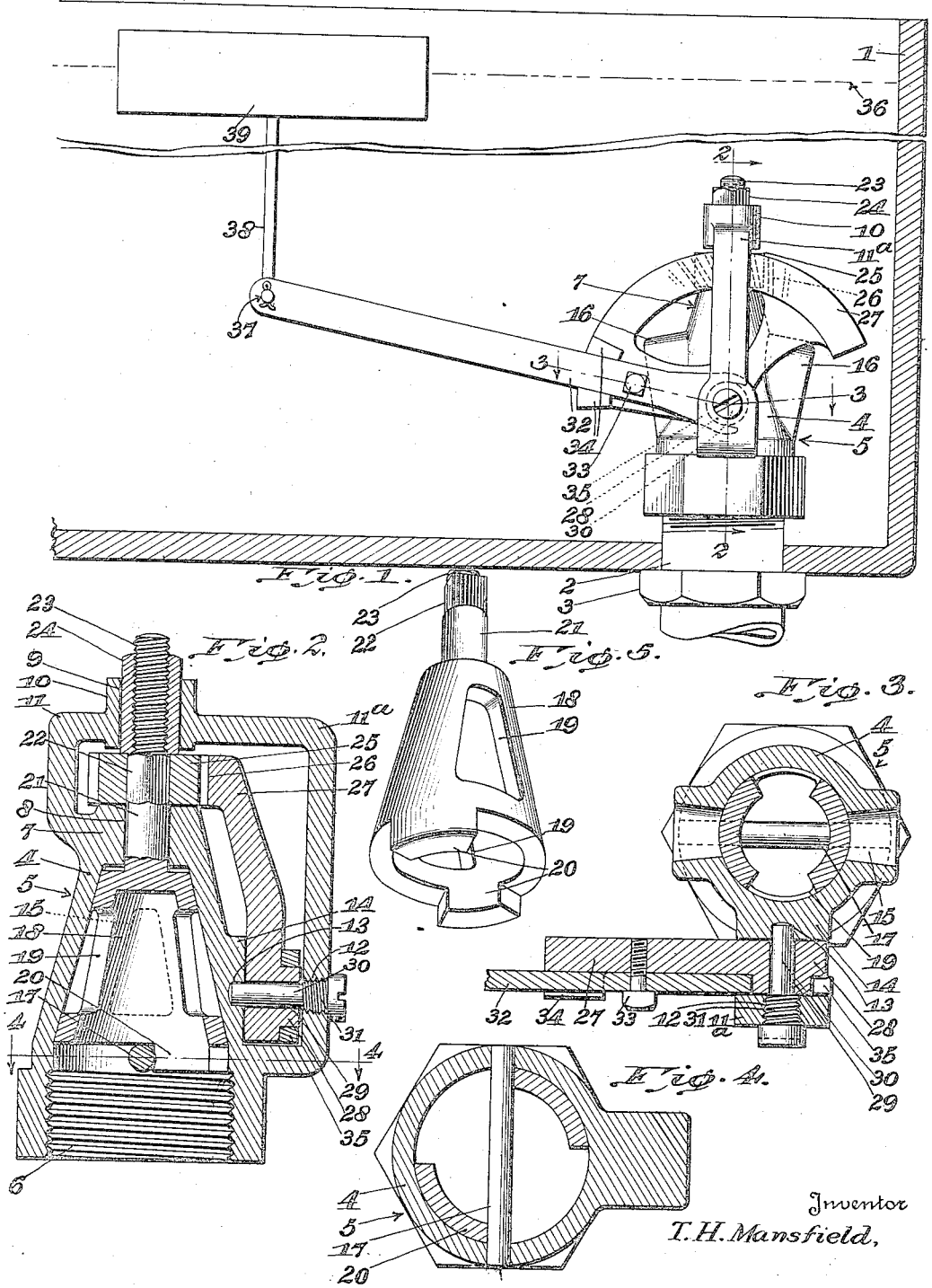
Inventor
T. H. Mansfield,
By Munn Anderson & Liddy
Attorneys Patented Dec. 10, 1935

2,023,765

UNITED STATES PATENT OFFICE 2,023,765

VALVE

Thomas Henry Mansfield, Fort Stockton, Tex.

Application December 5, 1934, Serial No. 756,154

5 Claims. (Cl. 251—91)

This invention relates to improvements in valves, especially of the type capable of operation by floats, and its objects are as follows:—

First, to provide a valve in which there is a sleeve nut which both secures the spiral tooth pinion on the valve stem and provides a bushing for the stem in the bearing hub of the valve body bracket.

Second, to make the supporting bracket for the hub which contains the foregoing bushing in the form of a guard for the gear segment which meshes with the pinion.

In the drawing:

Figure 1 is a sectional view of a part of a water tank, particularly illustrating the improved valve as installed therein.

Figure 2 is a vertical section of the float valve taken on the line 2—2 of Fig. 1.

Figure 3 is a cross section on the line 3—3 of Fig. 1.

Figure 4 is a cross section taken on the line 4—4 of Fig. 2.

Figure 5 is a perspective view of the hollow conical valve member.

In the drawing 1 designates a tank of any desired kind. This tank is herein considered as being of the type used in watering stock on farms, but it should be understood that the tank may be adapted to contain any other liquid, and that the improved float valve is also adapted to control liquids other than water.

An inlet pipe 2 projects into the tank from the bottom where it is secured by means 3 in any known manner. The body 4 of the float valve generally designated 5 is attached to the inner threaded end of the pipe 2, the body 4 having internal threads 6 (Fig. 2) for the purpose. The body 4 is hollow and is of an upwardly tapering configuration. In its solid top part 7 there is a bore 8 which is in axial alinement with a larger bore 9 in the hub 10 of a bracket 11.

This bracket extends from one side of the body 4 to the other (Fig. 2) the larger part designated 11a serving the purpose of both a guard and handle respectively for a segmental gear and for conveniently carrying the valve when loose. The part 11a has a threaded hole 12 in line with a cylindrical recess 13 in an enlargement 14 on one side of the body 4.

There are two outlets 15 in the body 4, situated on opposite sides. The body is extended over the outlets in the form of hoods 16. These hoods are downwardly directed (Fig. 1), the purpose of this being to deflect the water or other liquid downwardly toward the bottom of the tank 1 so as to prevent its being splashed over the rim of the tank. A stop pin 17 goes through the body 4, but in practice this pin could be cut out in the central part so as not to obstruct the water passage, the stopping function then being served by two short pins diametrically opposite to each other.

A hollow conical valve member 18 is turnably situated inside of the body 4. This has ports 19 which are registrable with the outlets 15 when the valve member is given a quarter turn. The bottom of the valve member has lugs 20 (Fig. 4), the ends of which are engageable with the stop pin 17 to limit the turning of the valve member in either direction. In Fig. 4 those ends of the lugs 20 which limit the turning of the valve member to the closed position are shown in engagement with the stop pin 17.

At its upper end the valve member 19 has a stem 21, the cylindrical portion of which is contained by the bore 8 in the part 7. That portion of the stem which extends above the part 7 is non-circular as at 22. Beyond that stem has a threaded terminal 23. This threaded terminal has a sleeve nut 24 screwed upon it. The cylindrical part of this nut turnably fits the bore 9 of the hub 10, and provides a bushing for the stem. The square part of the nut (Fig. 1) appears above the hub and is used to drive the sleeve nut home on the threaded terminal.

A function of the sleeve nut other than that of a bushing for the valve stem 21 is that of securing means for a pinion 25, which is emplaced on the non-circular part 22 prior to driving the sleeve nut home. This is a spiral tooth pinion, and its teeth mesh with corresponding teeth 26 (Fig. 1) on one side of a gear segment 27. The advantage of the spiral teeth is a freely working and convenient mesh, eliminating the need of bevelled teeth on the pinion 25 as would otherwise be necessary.

The gear segment 27 includes a hub 28 which has a center hole 29. A pin 30 has a threaded shoulder 31 driven into the hole 12 and when driven in the inner end of the pin occupies the recess 13 and provides a pivot for the segment 27.

A lever 32 provides for the operation of the float valve. This is secured to the gear segment 27 chiefly by only one screw 33. The function of this screw is aided by a pair of lugs 34 on the gear segment, between which lugs the lever is fitted, the inner end of the lever being forked at 35 to fit over the hub 28. The interengagement of the forked end and hub and the fitting of the lever between the pair of lugs alone serves to establish the position of the lever, the only remaining thing needed being the screw 33 which fixes the lever in that position.

The lever 32 would, in practice, be proportionately longer than illustrated in the drawing so that the buoyancy of the float will exercise sufficient force to turn the valve member 18 as the water level 36 rises and falls. The outer end of the lever has a hole 37 in which the stem 38 of the float 39 is secured in any desired manner.

The operation is readily understood. As the float 39 rises and falls the valve member 18 is turned in either one or the other direction to open or close the outlets 15, and thereby admit or cut off the flow of water as regards the tank 1. The gear segment 27 turns on its pivot pin 30 when the float moves as above stated, this turning being imparted to the valve member by way of the pinion 25.

An advantage of the hollow conical form of valve member 18 is that the upward pressure of the water will automatically seat the valve as well as make it self-grinding. The advantage of the particular form of sleeve nut 24 shown is that it serves the double purpose of assisting in securing the pinion 25 on the valve stem and of providing a bushing for the valve stem in the bearing hub 10. The advantage of the enlarged part 11a of the bracket 11 is that of guarding the gear segment 27 to a considerable extent. Should it so happen that the float valve were dropped on that side where the gear segment is situated, the bracket would receive the blow and thereby prevent injury to the gear segment.

The bracket has the additional purpose besides that of a handle mentioned before, of assisting in supporting both the stem 21 and the gear segment 27. Of course the stem has its main bearing in the bore 8, but the bearing hub 10 (part of the bracket) stabilizes the stem, while the enlarged part 11a (also part of the bracket) carries the pin 31 of the gear segment 27.

I claim:

1. A valve comprising a body having an inlet and an outlet, a ported valve member turnably carried by the body and having a stem extending out of the body, means by which to turn the valve member including a pinion mounted on the stem, and a gear segment in mesh with the pinion, there being means by which to mount the segment on the body, means which serves the purpose of a bushing, said means being affixed to the stem to assist in holding the pinion in place, and a bracket on the body including a bearing hub containing the bushing means, said bracket extending from the bearing hub over the gear segment to form a guard.

2. A valve comprising a body having an inlet and an outlet, a ported valve member turnably carried by the body and having a stem extending out of the body, means by which to turn the valve member, said means comprising a pinion on the stem and a gear segment to actuate the pinion, and means to both assist in stabilizing the stem and to support the segment, said means comprising a bracket having a bearing hub, means constituting a bushing on the valve stem and having bearing in the hub, and a pivot pin carried by the bracket and going through the gear segment.

3. A valve comprising a body having an inlet and an outlet, a ported valve member turnably carried by the body and having a stem extending out of the body, a pinion mounted on the stem and a gear segment for turning the pinion, a bracket on the body beginning at one side of the body and ending on the other side and therefore in embracing position with respect to the pinion and segment, said bracket having a bearing hub, a bushing attached to the valve stem both aiding in keeping the pinion in place and occupying the bearing hub to stabilize the valve stem, and a pin mounted between the bracket and valve body, said pin going through the segment to provide a pivotal mounting.

4. A valve comprising a body having an inlet and an outlet and having a top part with a bore, a bracket attached at its opposite ends to opposite sides of the body, said bracket having a bearing hub with a bore in line with the bore in said top part, a ported valve member turnably carried by the body, said member having a stem with a cylindrical portion occupying the bore of the top part, a non-circular portion situated between the top part and the hub, and a threaded terminal extending through the bore of the hub; a pinion fitted on the non-circular portion, a bushing screwed on the threaded terminal to assist in holding the pinion in place and having bearing in the bore of the hub, a gear segment in mesh with the pinion, said segment having a hub, and a pin driven through the bracket and through a hole in said gear into the valve body to pivotally support the gear.

5. In a valve, a valve body and a valve member turnable therein, a stem on said member extending through the body, a pinion mounted on the stem and comprising part of a turning means for turning the valve member, means carried by the body which constitutes a bearing, and a bushing attached to the valve stem serving the double purpose of assisting in holding the pinion in place and engaging the bearing means to stabilize the valve stem.

THOMAS HENRY MANSFIELD.